United States Patent [19]

Mazingue

[11] 3,995,869
[45] Dec. 7, 1976

[54] AUTOMATIC CLAMPING DEVICE FOR A CYLINDRICAL PIECE ROTATING ABOUT ITS LONGITUDINAL AXIS

[75] Inventor: Jean Mazingue, Epernay, France
[73] Assignee: Virax, France
[22] Filed: June 19, 1975
[21] Appl. No.: 588,500

[30] Foreign Application Priority Data
June 24, 1974 France .............................. 74.22351

[52] U.S. Cl. .................................. 279/33; 279/106
[51] Int. Cl.² ........................................ B23B 31/12
[58] Field of Search ............... 279/1 C, 33, 35, 106

[56] References Cited
UNITED STATES PATENTS

| | | | |
|---|---|---|---|
| 2,593,706 | 4/1952 | Von Zelensky | 279/33 |
| 2,627,195 | 2/1953 | Sporket | 279/33 X |
| 2,890,888 | 6/1959 | Damijonaitis | 279/33 X |
| 2,985,458 | 5/1961 | Everett | 279/33 X |
| 3,099,457 | 7/1963 | Hohwart et al. | 279/106 |
| 3,270,592 | 9/1966 | Behnke | 279/106 X |

FOREIGN PATENTS OR APPLICATIONS

| | | | |
|---|---|---|---|
| 1,142,973 | 9/1957 | France | 279/33 |

*Primary Examiner*—Othell M. Simpson
*Assistant Examiner*—William R. Briggs
*Attorney, Agent, or Firm*—Stevens, Davis, Miller & Mosher

[57] ABSTRACT

Apparatus for rotating a cylindrical workpiece to be machined, having one or two automatic clamping devices on a rotatable hollow driven shaft into which the workpiece is inserted. Each clamping device has three chuck jaws mounted to swing into clamping engagement with the workpiece. Two pivots are provided for each jaw which swings about one or the other of them depending on the direction of rotation: the provision of two pivots gives a smaller and less cumbersome apparatus. To make the pivots swing into clamping engagement, a floating drag plate is freely rotatable on the shaft adjacent the clamping device. It is braked, to restrain rotation with the clamping device but it is positively linked to each jaw by a gudgeon pin, so that on rotation of the clamping device the braking restraint on the floating drag plate is transmitted to the jaws and urges them into clamping engagement with the workpiece.

11 Claims, 6 Drawing Figures

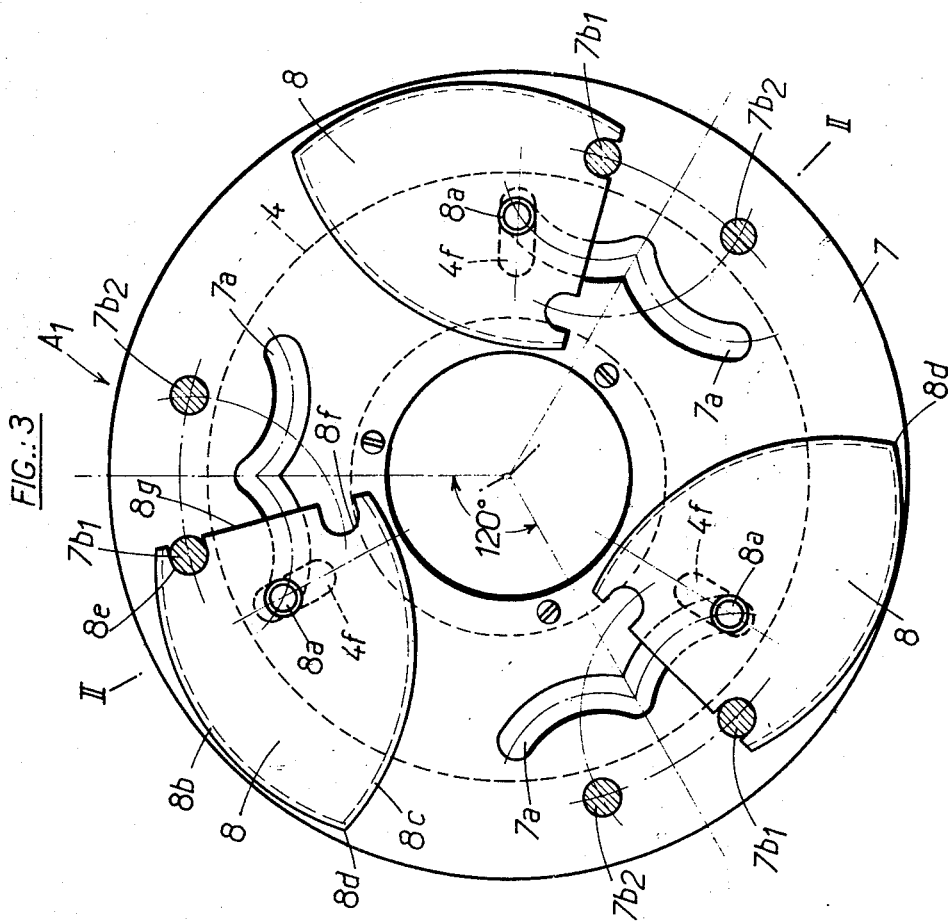
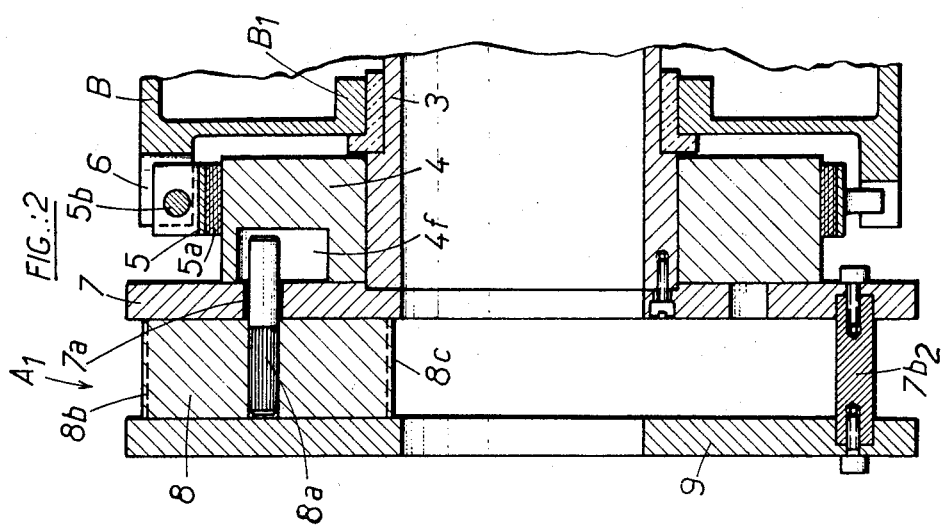

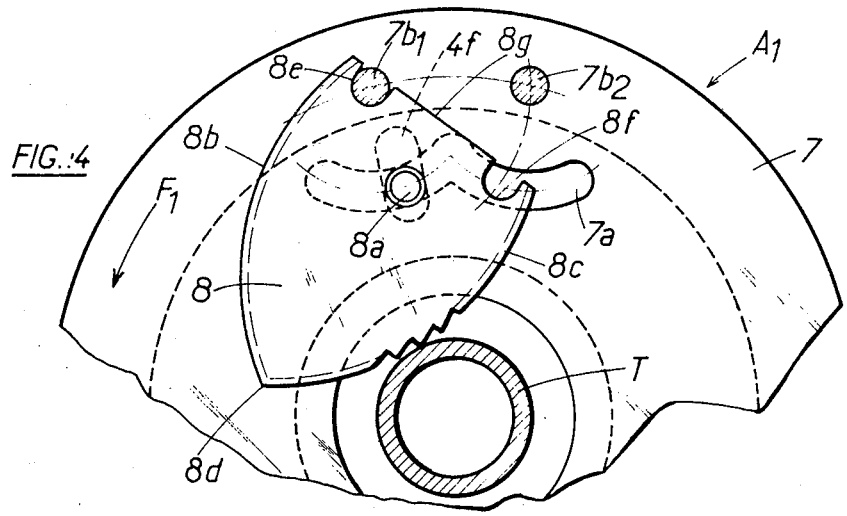
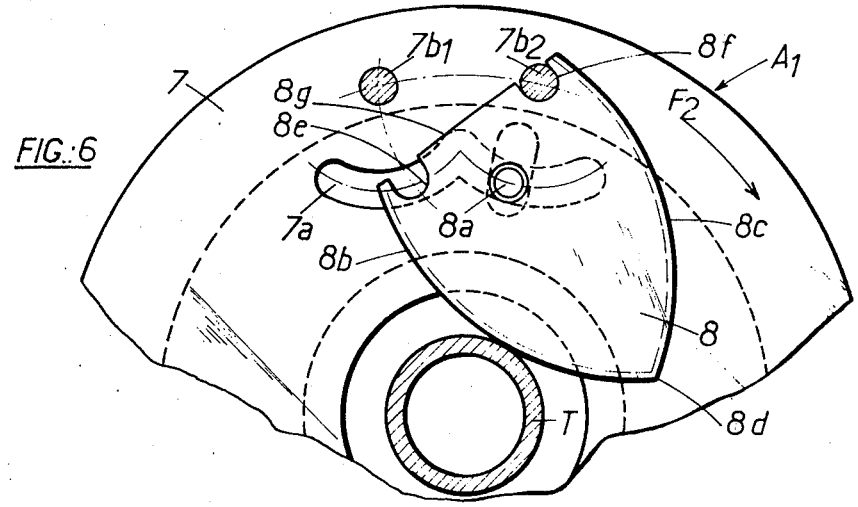
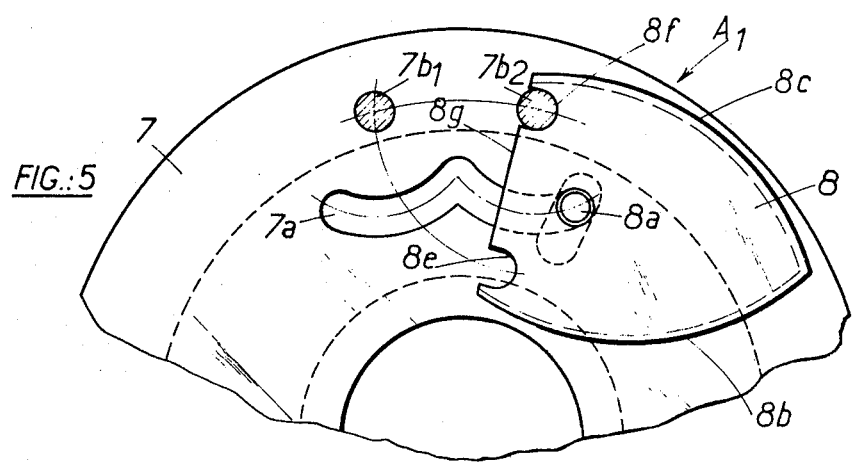

AUTOMATIC CLAMPING DEVICE FOR A CYLINDRICAL PIECE ROTATING ABOUT ITS LONGITUDINAL AXIS

FIELD OF THE INVENTION

The present invention relates to an apparatus for rotating a cylindrical work-piece which is to be machined such as a round tube or bar, comprising at least one clamping device and means for rotating the work-piece about its axis, in one direction or the other by means of this clamping device.

These apparatus are to cooperate, for example, with tools for threading the ends of tubes or bars, cutting tubes or bars, or inside threading of tubes.

BACKGROUND OF THE INVENTION

Various types of clamping devices for cylindrical workpieces exist, which are sometimes also known as clamp chucks. Some, which are manual, include an operating handwheel; others of the automatic type include a system which effects automatic displacement of the clamping jaws or chaps towards the work-piece (tube or bar) to be machined, on starting the system rotating.

Some clamping devices with automatic action are of the type known as reversible, i.e. they are capable of providing clamping of the workpiece in the two rotational directions, for example to cut left or right-handed threads, and the present invention concerns more particularly devices of this type.

Automatic clamping devices of the reversible type, comprising several clamping jaws of a generally triangular shape with two serrated or teethed faces, of which one or the other, according to the direction of rotation selected, come into contact with the piece to be clamped, are already known.

In these known devices, each clamping jaw is mounted pivotably about a single pivot carried by an annular rotatable chuck plate and, according to its initial chosen position, it acts with one or the other of its two serrated faces on the piece to be clamped. Although such a device appears simple in principle, its practical realization is complicated and moreover requires the use of very cumbersome jaws, each pivoting about a single pivot relatively remote from the axis of the piece to be machine. A machine thus equipped is therefore relatively complicated, cumbersome and costly.

SUMMARY OF THE INVENTION

It is the object of the present invention, generally speaking, to simplify the design of this apparatus and to make it less cumbersome and costly.

To this effect, in a clamping device described in the preamble, the annular rotatable chuck plate includes according to the invention, for each clamping jaw, two separate pivots on one or the other of which, according to the direction of rotation, the said jaw hinges and rests during and at the end of its displacement. Preferably, each jaw includes two notches, one or the other of which, according to the direction of rotation selected, is engaged by one of the said pivots.

As will be seen, such a device allows the use, for each jaw, of a pair of pivots which are much closer to the axis of the workpiece to be machined than the single pivot of known machines. As a result, each jaw and the whole of the apparatus can be considerably less cumbersome than jaws and machines which are known.

It is a further object of the invention to provide simple and effective means for causing each jaw to pivot into clamping engagement with the workpiece when rotation starts. To this effect, in a preferred construction the clamping device also includes a floating annular drag element arranged adjacent the other side of the said rotatable chuck plate coaxial with the shaft and freely rotatable both relative to this shaft and to the fixed frame of the apparatus and brake means carried by the frame to restrain the drag element from rotating. This drag element includes, for each clamping jaw, a radial groove facing the rotatable chuck plate, and this rotatable chuck plate is itself pierced, facing each clamping jaw, with a slot. Each jaw is rigidly fixed to a gudgeon pin extending parallel to the axis of rotation of the apparatus and extending through the said slot and into the corresponding radial groove formed in the floating annular drag element.

Preferably the slot has two curvilinear branches which are arcs of circles centered respectively on one or the other of two said pivots carried by the said rotatable chuck plate, and the intersection of the two arcs is equidistant from the said pivots.

The number of clamping jaws is preferably three, arranged at 120° with respect to each other, with two pivots carried on the rotatable chuck plate and corresponding to each of these jaws.

Preferably the apparatus include two similar clamping devices disposed respectively at the two extremities of the rotatable shaft. Each of these clamping devices is independent of the other, to give better clamping, at two areas spaced one from the other, of a tube or bar having local variations in diameter.

DESCRIPTION OF THE DRAWINGS

FIG. 2 is a detail view, in section on the line II—II of FIG. 3, of a clamping device with a cover.

FIG. 3 is an end view of the same clamping device, with the cover removed.

FIGS. 4, 5 and 6 are partial views, analogous to FIG. 3, showing other operating positions of the said clamping device.

DESCRIPTION OF PREFERRED EMBODIMENT

Figure 1:
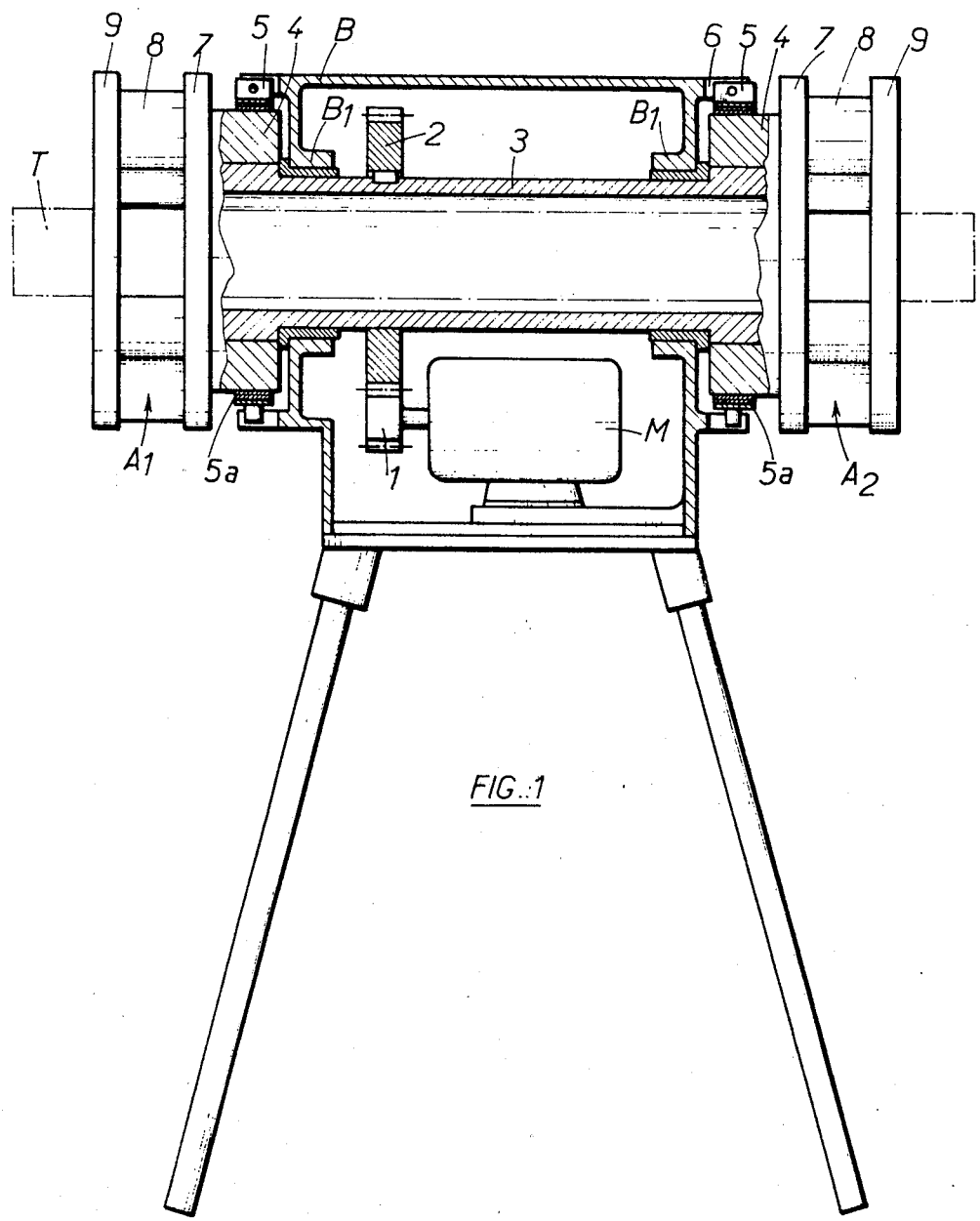
FIG. 1 is a schematic view, partially in section, of an apparatus for rotating cylindrical workpieces and equipped with two clamping devices.

In FIG. 1 there is shown an apparatus for rotating cylindrical workpieces which are to be machined, such as round tubes or bars. The apparatus could, for example, cooperate with a tool (not shown) for threading the ends of tubes.

This apparatus has a fixed frame B, two clamping devices, $A_1$ and $A_2$ with automatic action, and a drive mechanism for rotating these two clamping devices, and hence rotating the workpiece in one direction or the other about its axis. In the example shown, this driving mechanism is a reversible motor M (for example an electric motor), whose shaft carries a gear wheel 1 which cooperates with a toothed wheel 2 rigidly locked to, so as to rotate with, a hollow cylindrical shaft 3 into which the workpiece to be machined (for example a tube T) is inserted. The shaft 3 is mounted for rotation about its axis, on two bearings $B_1$, carried by the frame B.

The two clamping devices $A_1$ and $A_2$ are identical, and the one on the left, $A_1$ is shown in detail in FIGS. 2 and 3.

Each clamping device has a rotatable annular chuck plate 7 fixed coaxially to one of the ends of the shaft 3, a rotatable front cover 9 in spaced parallel relation to this chuck plate, and one or several clamping jaws 8, at one side of the chuck plate, between it and the cover 9. In the example shown, the clamping jaws are three in number arranged at 120° to each other.

Each clamping jaw is of a generally triangular shield shape and is substantially symmetrical with two serrated or toothed curved edges 8b, 8c meeting at a point 8d. One or the other of these edges, depending on the direction of rotation selected, comes into contact with the workpiece T to be clamped. As is shown in FIG. 4, the clamping teeth formed on these two edges are inclined towards the point 8d. (The teeth are omitted from the other figures). Each jaw also includes a third edge 8g in which two notches 8e and 8f are formed close to the edges 8b and 8c respectively. Each jaw 8 is rigidly fixed to a gudgeon pin 8a which extends parallel to the axis of rotation of the apparatus. Means, which will presently be described, permit the displacement of the jaws 8 with respect to and parallel to the rotatable chuck plate 7, to come into clamping engagement with the workpiece T to be machined.

Each jaw 8 has two corresponding separate pivots, in the form of pivot pins $7b_1$ and $7b_2$ which extend parallel to the axis of the workpiece of the apparatus, each one being fixed at one of its ends to the rotatable chuck plate 7, and at the other end to the front cover (see FIG. 2). These pivots are situated close to the periphery of the chuck plate 7. Depending on the direction of rotation selected, the jaw 8 hinges and comes to rest during and at the end of its displacement either on pivot $7b_1$ by means of its notch 8e, or on pivot $7b_2$ by means of its notch 8f. Each notch is shaped to engage with the shape of the corresponding pivot.

The rotatable chuck plate has a slot 7a with two curvilinear branches facing each clamping jaw 8. Each branch is an arc of a circle centered one on the pivot $7b_1$ and the other on the pivot $7b_2$. The intersection of these arcs, i.e. the peak of this slot, is equidistant from the two pivots $7b_1$ and $7b_2$.

Each clamping device also includes a floating annular drag plate 4, mounted coaxially with the shaft 3 adjacent the chuck plate 7 and on the opposite side to the jaws 8. This floating plate is freely rotatable both with respect to the said shaft and with respect to the fixed frame B of the apparatus, but can be restrained with respect to the frame B by a braking device carried by the said frame by means of fixing lugs 6, and including a brake lining 5a which comes into contact with and bears against the periphery of the floating drag plate 4. This lining is rigidly fixed to a ring 5 which can be clamped or unclamped with the aid of means 5b, in order to put said braking device into or out of operation.

The floating plate has radial grooves 4f, equal in number to the number of clamping jaws 8, and each directed towards the rotatable chuck plate 7. There is thus, corresponding to each jaw 8S slot 7a, a radial groove 4f, and two pivots $7b_1$ and $7b_2$. As shown in FIGS. 2 and 3, the gudgeon pin 8a of the jaw extends through the slot 7a of the rotatable chuck plate and into the corresponding radial groove 4f of the floating drag plate 4. The widths of the slot 7a and the groove 4f are very slightly greater than the diameter of the gudgeon pin 8a so as to allow the latter to slide freely.

The apparatus operates as follows: Assuming that the direction of rotation selected is such that the clamping device A, as viewed in FIG. 3, moves anti-clockwise, then initially the jaws 8 of device $A_1$ are as shown in FIG. 3, with the gudgeon pin 8a of each jaw located in abutment with one of the ends of the corresponding slot 7a and the notch 8e of each jaw 8 being engaged with the corresponding pivot $7b_1$, and also the braking device 5–5a–5b is in operation, tending to restrain the floating drag plate 4, i.e. to hold it stationary with respect to the frame B.

After inserting the workpiece T inside the shaft 3, the motor M is started. The shaft 3, and each chuck plate 7 and front cover 9 start to turn in the direction of the arrow $F_1$ (see FIG. 4).

The floating drag plate 4 carrying the grooves 4f being stationary, each gudgeon pin 8a is held, and can only move radially in its groove 4f. The chuck plate 7 carrying the slots 7a and the pairs of pivots $7b_1$ and $7b_2$ rotates and that curved branch of each slot 7a which is centered on the pivot $7b_1$ now moves with respect to the corresponding gudgeon pin 8a, imposing a radial displacement on the latter, the maximum amplitude of this displacement, because of the construction, being less than the radial length of the groove 4f. At the same time each pivot $7b_1$ engaging the notch 8e of the corresponding jaw, makes the jaw swing towards the workpiece to be clamped, up to the point where the serrated edge 8c of the jaw comes into contact with the said piece. The various parts of the apparatus are then in the final relative position illustrated in FIG. 4.

When the swing movement is arrested by the workpiece T, the jaws 8 cause the workpiece to be clamped and blocked, and each pivot $7b_1$ becomes an abutment absorbing the reaction to clamping.

From this moment the jaw 8 and the workpiece T are rotationally fast with the rotatable chuck plate 7 and the shaft 3. Because of this, the gudgeon pin 8a via the intermediary of the groove 4f, makes the floating drag plate 4 start to turn at the speed of rotation of the shaft 3 against the restraint of the braking device 5–5a–5b. This latter, having fulfilled its function, can be taken out of operation, but this is not absolutely necessary. During the whole time that the jaw 8 is clamping the piece, the gudgeon pins 8a do not support any load, except possibly that of opposing possible braking which is still applied to the floating drag plate 4.

FIGS. 5 and 6 respectively are similar views to FIGS. 3 and 4 but correspond to the case where the opposite direction of rotation is chosen, i.e. clockwise as viewed in FIG. 3. The jaws are then in the initial position shown in FIG. 5, in which the gudgeon pin 8a of each jaw abuts against the other end of the corresponding slot 7a, the notch 8f of the jaw being engaged with pivot $7b_2$. In operation the motor M turns the shaft 3, the chuck plate 7 and the front cover 9 in the direction indicated by the arrow $F_2$ FIG. 6. The curved branch of each slot 7a which is centered on the corresponding pivot $7b_2$ moves relative to the gudgeon pin 8a causing the latter to move radially. At the same time the pivot $7b_2$ engaging the notch 8f of each jaw 8 causes the jaw to swing up to the point where the serrated edge 8b of the jaw comes into contact with the workpiece T. In the final relative position shown in FIG. 6, the workpiece T is clamped and blocked by the jaw 8 and the pivots $7b_2$ become abutments absorbing reaction to the clamping.

The peaks of the slots 7a correspond to an intermediate position of the jaws 8 making it possible to change at will from one direction of rotation to the other.

A basic advantage in the reversible apparatus according to the invention stems from the presence for each jaw 8 of two separate pivots $7b_1$ and $7b_2$ instead of one single pivot as in certain known reversible apparatus. These two pivots are fairly close to the axis of the apparatus so that the size of the jaws 8 is small and the general degree of cumbersomeness of the apparatus is reduced for a given diameter of workpiece to be clamped. Contrary to this, in the case of known reversible apparatus having a single pivot for each jaw, the dimensions of the jaws and the general degree of cumbersomeness of the apparatus would be considerably greater for a given diameter of workpiece to be clamped, since this single pivot is of necessity much further from the axis of the apparatus precisely in order to permit this reversability.

A further advantage of the invention resides in the fact that a single driving motor M makes it possible to drive simultaneously two clamping devices $A_1$ and $A_2$, which nevertheless remain independent of each other, which gives better clamping at two spaced points of a workpiece having local variations in diameter.

It is to be understood that the embodiment described is an example only and could be modified, particularly by the substitution of technical equivalents, without departing from the scope of the invention. In particular, the number of jaws could be different from three.

I claim:

1. An apparatus for rotating a workpiece, comprising:
   a. a body;
   b. a hollow shaft for receiving the workpiece, said shaft being mounted in said body and rotatable in either direction about an axis of rotation of said shaft; and
   c. at least one automatic clamping means for clamping the workpiece, said clamping means including a chuck plate fixed on said shaft, at least one clamping jaw to contact the workpiece, and means swingingly mounting each said jaw to said chuck plate, said mounting means including first pivot means about which said jaw can swing, and second pivot means for moving said jaw about said first pivot means, said second pivot means including two pivots spaced-apart on and rotatable with said chuck plate, said clamping jaw having an edge including means engageable with said two pivots for hinging and bearing one of said two pivots depending on the direction of rotation of said shaft.

2. Apparatus according to claim 1 wherein said clamping jaw has an edge including said engageable means, said engageable means having two notches engageable with respective pivot pins forming said pivots, a respective one of said notches, depending on the direction of rotation of said shaft, being engaged by a respective one of said pivots.

3. Apparatus according to claim 1 further comprising a floating annular drag plate coaxial with said shaft and rotatable relative thereto, brake means mounted to said body for restraining rotation of said drag plate, and wherein said first pivot means is connected between said drag plate and said jaw, so that on rotation of said shaft the restraint on rotation of said drag plate by said brake means is transmitted to said jaw, urging said jaw into clamping engagement with the workpiece.

4. Apparatus according to claim 3 wherein said chuck plate has two axial faces, each said jaw is adjacent one of said axial faces and said drag plate is adjacent the other of said axial faces, said drag plate has a radially extending groove adjacent said chuck plate, said chuck plate has a slot facing each said jaw and said drag plate, and said first pivot means comprises a gudgeon pin carried by each said jaw and extending through said slot into said radially extending groove.

5. Apparatus according to claim 4 wherein said slot has two curvilinear branches, each branch being an arc of a circle centered on a respective one of said two pivots, said arcs intersecting at a point equidistant from said two pivots.

6. Apparatus according to claim 3 further comprising means for putting said brake means into and out of operation.

7. Apparatus for rotating a cylindrical workpiece, comprising:
   a. a stationary supporting frame;
   b. a hollow shaft, having an axis, for receiving the workpiece concentric with said axis;
   c. means mounting the hollow shaft to said stationary supporting frame for rotation of said shaft about said axis;
   d. drive means for rotating said shaft in either direction about said axis; and
   e. at least one automatic clamping means for clamping the workpiece, said clamping means comprising:
      i. a chuck plate fixed on said shaft and coaxial therewith, said chuck plate having two axial faces;
      ii. at least three swingable clamping jaws adjacent one of said axial faces of said chuck plate;
      iii. first pivot means for each respective clamping jaw and about which said jaw can swing;
      iv. second pivot means for each respective jaw for moving said jaw about said first pivot means, including two pivots spaced-apart on and rotatable with said chuck plate and associated with one respective jaw, each said jaw including means engageable with said two pivots for hinging and resting on a respective one of said two pivots depending on the direction of rotation of said shaft, and;
      v. drag means for urging said jaws generally towards said axis.

8. Apparatus according to claim 7 wherein said drag means comprises:
   a. a floating annular drag plate adjacent the axial face of said chuck plate opposite said jaws, said drag plate being coaxial with said shaft and rotatable relative thereto and relative to said frame, and having radial grooves each facing said chuck plate and operatively associated with a respective jaw; and
   b. brake means mounted on said frame for restraining rotation of said drag plate relative thereto; and
   c. slots in said chuck plate and each slot associated with a respective jaw, each said slot including two arcs of circles each centered on a respective one of said two pivots corresponding to a jaw, and intersecting at a point equidistant from said two pivots; wherein said first pivot means includes a gudgeon pin carried by each said jaw, said pin passing through the corresponding said slot in said chuck plate and engaging the corresponding radial groove in said drag plate, whereby on rotation of said shaft the restraint imposed by said brake means on rotation of said drag plate is transmitted to said jaws so that said jaws hinge about a respective one of said two pivots into clamping engagement with the workpiece.

9. Apparatus according to claim 7 wherein said at least three clamping jaws includes three clamping jaws arranged rotationally symmetrically about said axis.

10. Apparatus according to claim 7 comprising two similar clamping means disposed respectively at each end of said rotatable shaft.

11. Apparatus according to claim 7 wherein each jaw is of a symmetrical shield shape having two curved edges and a straight edge, said curved edges being serrated to grip the workpiece and said straight edge having two notches, engageable with respective pivot pins forming said two pivots, a respective one of said pivots engaging a respective one of said notches, depending on the direction of rotation of said shaft.

* * * * *